United States Patent
Valadez

(10) Patent No.: US 7,616,783 B2
(45) Date of Patent: Nov. 10, 2009

(54) SYSTEM AND METHOD FOR QUANTIFYING MOTION ARTIFACTS IN PERFUSION IMAGE SEQUENCES

(75) Inventor: Gerardo Hermosillo Valadez, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 646 days.

(21) Appl. No.: 11/328,621

(22) Filed: Jan. 10, 2006

(65) Prior Publication Data

US 2006/0182349 A1 Aug. 17, 2006

Related U.S. Application Data

(60) Provisional application No. 60/643,418, filed on Jan. 12, 2005.

(51) Int. Cl.
*G06T 7/20* (2006.01)
(52) U.S. Cl. .................................. 382/107; 382/130
(58) Field of Classification Search ............... 382/107, 382/130, 128, 236
See application file for complete search history.

(56) References Cited

U.S. PATENT DOCUMENTS

| | | | | | |
|---|---|---|---|---|---|
| 4,802,093 A | * | 1/1989 | Ema | ............................... | 378/1 |
| 5,214,711 A | * | 5/1993 | Neely et al. | .................. | 382/107 |
| 6,160,901 A | * | 12/2000 | Kage | ............................ | 382/107 |

OTHER PUBLICATIONS

Meijering et al, "Retrospective Motion Correction in Digital Subtraction Angiography: A Review" IEEE Transactions on Medical Imaging, vol. 18, No. 1, Jan. 1999, pp. 2-21.*

(Continued)

*Primary Examiner*—Jon Chang

(57) ABSTRACT

A method of evaluating the quality of a the quality of a match between two digitized images includes providing a pair of digitized images $I_1(x,y,z)$ and $I_2(x,y,z)$, each image comprising a plurality of intensities corresponding to a domain of points (x,y,z) on an 3-dimensional grid, calculating a motion quantification measure from said pair of images, the motion quantification measure $|\langle I_\Delta^- \rangle|$ defined by $$|\langle I_\Delta^- \rangle| = \frac{\beta}{N^-} \sum_{x,y,z} [f(I_\Delta(x,y,z)) \mid I_\Delta(x,y,z) < 0]$$

wherein the sum is restricted to those $I_\Delta<0$, $f$ is a function, $\beta$ is a constant, $N^-$ is the number of domain points with negative subtraction image values, and wherein $I_\Delta(x,y,z)=I_2(x,y,z)-I_1(x,y,z)$.

The images depict the same object but are acquired at different times.

16 Claims, 3 Drawing Sheets

OTHER PUBLICATIONS

"Retrospective Motion Correction in Digital Subtraction Angiography: A Review", Meijering et al, IEEE Transactions on Medical Imaging, IEEE Service Center, Piscataway, NJ, US, vol. 18, No. 1, Jan. 1999.

"Motion correction for digital subtraction angiography", Potel et al., IEEE Frontiers of Engineering and Computing in Health Care—1983, Proceedings of the Fifth Annual Conference, Sep. 10, 1983, pp. 168-169.

"Performance evaluation of image registration", Coutre et al, Engineering in Medicine and Biology Society, 2000, Proceedings of the $22^{nd}$ Annual International Conference of the IEEE Jul. 23-28, 2000, Piscatway, NJ, vol. 4, Jul. 23, 2000, pp. 3140-3143.

"Flows of diffeomorphisms for multimodal image registration", Chefd'hotel et al., Biomedical Imaging, 2000, Proceedings, 2000 IEEE International Symposium on Jul. 7-10, 2002, pp. 753-756.

"Software for image registration: Algorithms, accuracy, efficacy", Hutton et al., Seminars in Nuclear Medicine, Grune and Stratton, Orlando, FL, vol. 33, No. 3, Jul. 2003, pp. 180-192.

International Search Report including Notification of Transmittal of the International Search Report, International Search Report and Written Opinion of the International Searching Authority, PCT Appln. No. PCT/US2006/001003, mailed Jun. 14, 2006.

* cited by examiner

SYSTEM AND METHOD FOR QUANTIFYING MOTION ARTIFACTS IN PERFUSION IMAGE SEQUENCES

CROSS REFERENCE TO RELATED UNITED STATES APPLICATION

This application claims priority from "Method for Quantifying Motion Artifacts in Perfusion Image Sequences", U.S. Provisional Application No. 60/643,418 of Gerardo Hermosillo Valadez, filed Jan. 12, 2005, the contents of which are incorporated herein by reference.

TECHNICAL FIELD

This invention is directed to the automatic evaluation of the quality of a match between two or more digitized images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

In many diagnostic settings, a previously obtained volumetric image is used to guide a medical procedure, such as an examination of an organ. During the course of this procedure, new readings of the organ are frequently acquired that need to be correlated with the volumetric image guiding the examination. These new readings need not be from the same imaging modality used to create the volumetric image. For example, during an electrophysiological examination of the heart, a map of the electric properties of the heart wall is acquired. To support a diagnosis, a 3D CT or MR scan is often acquired before the procedure. These scans typically show quite well the boundary between the inside of the heart chambers and the heart wall, as determined by look-up tables that map pixels in the inside of the chamber to transparent opacity values. Since these images are complementary to each other, the integration of useful data from separate images is often desired. Registration, a first step in this integration process, aims to bring the multiple images involved into spatial alignment.

Image registration is an optimization problem that finds a geometric transformation that maps points from a source dataset space into homologous points in a target dataset space. Registration of 2D/3D medical images is a vital component of a large number of registration and fusion applications. In the areas of diagnosis, planning, evaluation of surgical and radio-therapeutical procedures, typically multiple single-modality, or multi-modality images are acquired in the clinical track of events. Since these images are complementary to each other, the integration of useful data from separate images are often desired. Registration, a first step in this integration process, aims to bring the multiple images involved into spatial alignment. The objective of image registration is to describe a geometric mapping between two images with some kind of a model, which usually is dependent on parameters, known as registration parameters. The model determines the type of registration, whether it is a rigid, affine, deformable, registration, etc., and therefore the specifics of the registration parameters. N-D dynamic registration is defined as the registration between n-dimensional image datasets where at least one of them is changing over time (moving, deforming, etc.). Image registration has been studied in various contexts due to its significance in a wide range of areas, including medical image fusion, remote sensing, recognition, tracking, mosaicing, and so on.

Registration can be characterized as either rigid or non-rigid. Rigid registration considers only rotation and translation of the whole image to make it fit to the image to it is to be registered. In the case of 2D images, there are three registration parameters: one for the rotation and two for translation. Non-rigid registration includes, apart from these rigid transformations, affine transformations and deformable transformations. In an extreme case each pixel of a first image can be mapped to a pixel of the second image, independently of the rest of the image. Non-rigid registration has to be specified more precisely when it comes to its actual implementation. Usually a deformation is modeled in a certain way and parameterized.

Image registration aims to spatially align one image to another. For that purpose, parameters of a global transformation model, such as a rigid, affine or projective transformation, are to be recovered to geometrically transform a moving image to achieve high spatial correspondence with a fixed image. The problem has been studied in various contexts due to its significance in a wide range of areas, including medical image fusion, remote sensing, recognition, tracking, mosaicing, and so on.

Perfusion image sequences are a common diagnostic tool. In a typical scenario, an image of a region of interest in a patient's body is acquired previous to the injection of a contrast agent. As the agent diffuses through the patient's blood stream, one or more images of the same region are acquired. Typically, regions that enhance due to contrast agent intake are considered suspicious, as, for example, in the case of a breast magnetic resonance (MR) diagnosis. By viewing the subtraction of any of the post-contrast images from the pre-contrast images, a physician can quickly locate suspicious regions. Unfortunately, however, patient motion can introduce artifacts that render this task more difficult, time consuming, and less accurate.

To reduce these artifacts, a motion correction step can be performed that compensates to some extant for patient motion, which is typically non-rigid. A number of methods of motion correction for series of time-successive images (scenes) are known from the literature. FIG. 1 illustrates an example of the results of a motion correction algorithm applied to a perfusion sequence of the breast. The image on the left depicts the subtraction between the first post-contrast image minus the pre-contrast image. The right hand image depicts the same subtraction after motion correction.

SUMMARY OF THE INVENTION

Exemplary embodiments of the invention as described herein generally include methods and systems for quantifying the amount of motion artifacts in a perfusion sequence independently of any motion correcting algorithm. Providing these measures allows for the automatic evaluation of any motion correction algorithm by comparing the measure before and after the correction. Potential applications include the automatic comparison of different motion correction algorithms, the automatic triggering of a motion correction step, and the automatic tuning of the parameters of a given motion correction algorithm.

According to an aspect of the invention, there is provided a method of evaluating the quality of a match between two digitized images including the steps of providing a pair of digitized images, each image comprising a plurality of intensities corresponding to a domain of points on an 3-dimensional grid, wherein said images depict the same object at different times, and wherein a contrast enhancing agent was applied to said object before the acquisition of at least one of said images, calculating a difference of said pair of images, and calculating a motion quantification measure from said difference of said pair of images, wherein said motion quantification measure quantifies motion artifacts in said pair of images.

According to a further aspect of the invention, the pair of images is related by a deformation field of the domain of a first image of said pair of images into the domain of a second image of said pair of images, wherein said difference is computed using the deformation field for said first image.

According to a further aspect of the invention, the deformation field $\Phi=(\phi_x,\phi_y,\phi_z)$ for transforming a point (x,y,z) in the first domain into a point (X,Y,Z) in the second domain is defined by $$\begin{cases} X = \phi_x(x, y, z) = x + u_x(x, y, z) \\ Y = \phi_y(x, y, z) = y + u_y(x, y, z), \\ Z = \phi_z(x, y, z) = z + u_z(x, y, z) \end{cases}$$

wherein $u_x$, $u_y$, $u_z$ are displacement fields.

According to a further aspect of the invention, the motion quantification measure measures the quality of the deformation field relating the pair of images.

According to a further aspect of the invention, the difference of said pair of images is a subtraction image $I_\Delta$ comprising $$I_\Delta(x,y,z)=I_2(x,y,z)-I_1(x,y,z),$$

wherein (x,y,z) represents a point in the domain, $I_1(x,y,z)$ is said first image and $I_2(x,y,z)$ is said second image.

According to a further aspect of the invention, the motion quantification measure $|\langle I_\Delta^- \rangle|$ comprises $$|\langle I_\Delta^- \rangle| = \frac{\beta}{N^-} \sum_{x,y,z} [f(I_\Delta(x, y, z)) | I_\Delta(x, y, z) < 0],$$

wherein the sum is restricted to those $I_\Delta<0$, $f$ is a function, $\beta$ is a constant, and $N^-$ is the number of domain points with negative subtraction image values.

According to a further aspect of the invention, the constant $\beta$ is equal to about 1.0, and the function $f$ is the absolute value function.

According to a further aspect of the invention, the images depict the same object acquired through different imaging modalities.

According to another aspect of the invention, there is provided a program storage device readable by a computer, tangibly embodying a program of instructions executable by the computer to perform the method steps for evaluating the quality of a match between two digitized images.

DETAILED DESCRIPTION OF THE PREFERRED EMBODIMENTS

Exemplary embodiments of the invention as described herein generally include systems and methods for quantifying the amount of motion artifacts in a perfusion sequence, and measuring the closeness of a registration deformation to an ideal deformation.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Image registration between a pair of images $I_1:\Omega \subset R^3 \mapsto R$ and $I_2:\Omega \subset R^3 \mapsto R$ seeks a coordinate transformation $\Phi:\Omega \mapsto \Omega$ between the 3D image domains such that $I_1 \approx I_2 \circ \Phi$. Note that the product here is a composition of mappings, in that the transformed $I_2$ is a function of the transformed domain $\Phi$. It is sometimes more convenient to determine a displacement field u, where $\Phi=Id+u$, where Id represents the identity map. Assuming the images have the same modality, the idea is to maximize their similarity by, for example, minimizing the sum of squared differences between their intensities. For the case where the two images represent images acquires before and after the injection of a contrast agent into an organ such as the lungs, the transformation Φ serves to correct for motion of the lungs between the acquisition of the two images.

Figure 1:
FIG. 1 illustrates an example of the results of a motion correction algorithm applied to a perfusion sequence of the breast, according to an embodiment of the invention.

If the registration transformation perfectly corrected for the motion, the motion artifacts should be eliminated in the subtraction image. In actuality, this is rarely the case. As can be seen in the pair of lung images in FIG. 1, motion artifacts can be characterized by the fact that they appear in subtraction images as bright areas that appear to be always paired with dark areas. This observation derives from the fact that motion alone does not change the average intensity of an image, and thus, under motion alone, the average value of a subtraction image should always be zero. Thus, bright regions always have corresponding dark regions.

On the other hand, the intake of a contrast enhancing agent always produces image enhancement, and the effects of the agent appear exclusively as bright regions in the subtraction image. Thus, computing the total residue of the subtraction image is unreliable as a measure of motion artifacts, because bright regions could be due to both motion and contrast-agent intake. However, dark regions in the subtraction image can only be due to either motion or noise. Since the noise of a motion corrected image is the same as the noise of its non-motion corrected counterpart, only reduced motion artifacts can explain a diminishment in the average value of the negative (i.e. dark) regions in a subtraction image.

According to an embodiment of the invention, negative values of the subtraction image can be used as indicators of motion artifacts. One motion artifact measure according to an embodiment of the invention is the absolute value of the average intensity computed from all pixels with negative values in the subtraction image. A motion quantification measure (MQM) according to an embodiment of the invention can be defined as $$|\langle I_\Delta^- \rangle| = \frac{\beta}{N^-} \sum_{x,y,z} [I_\Delta(x, y, z) \mid I_\Delta(x, y, z) < 0]$$

where $I_\Delta$ is the subtraction image, $N^-$ is the number of pixels with negative subtraction image values, $\beta$ is an arbitrary constant, and $I_\Delta$ is defined by $$I_\Delta(x,y,z) = I_1(x,y,z) - I_2(x,y,z),$$

for each x,y,z. According to one embodiment of the invention, the constant $\beta$ is equal to 1. The images $I_1$ and $I_2$ can be, according to an embodiment of the invention, images acquired as part of a time sequence of images of a region of interest. The domain (x,y,z) of one of the images can also be, according to an embodiment of the invention, can be subjected to a motion correcting deformation that would register the pair of images. In addition, one or both of the images can be acquired after the application of a contrast enhancing perfusion agent, where the domain of one of the images is again subject to a motion correcting deformation to register the images. This MQM value is proportional to the amount of the motion artifacts in the image pair under consideration.

Figure 3:
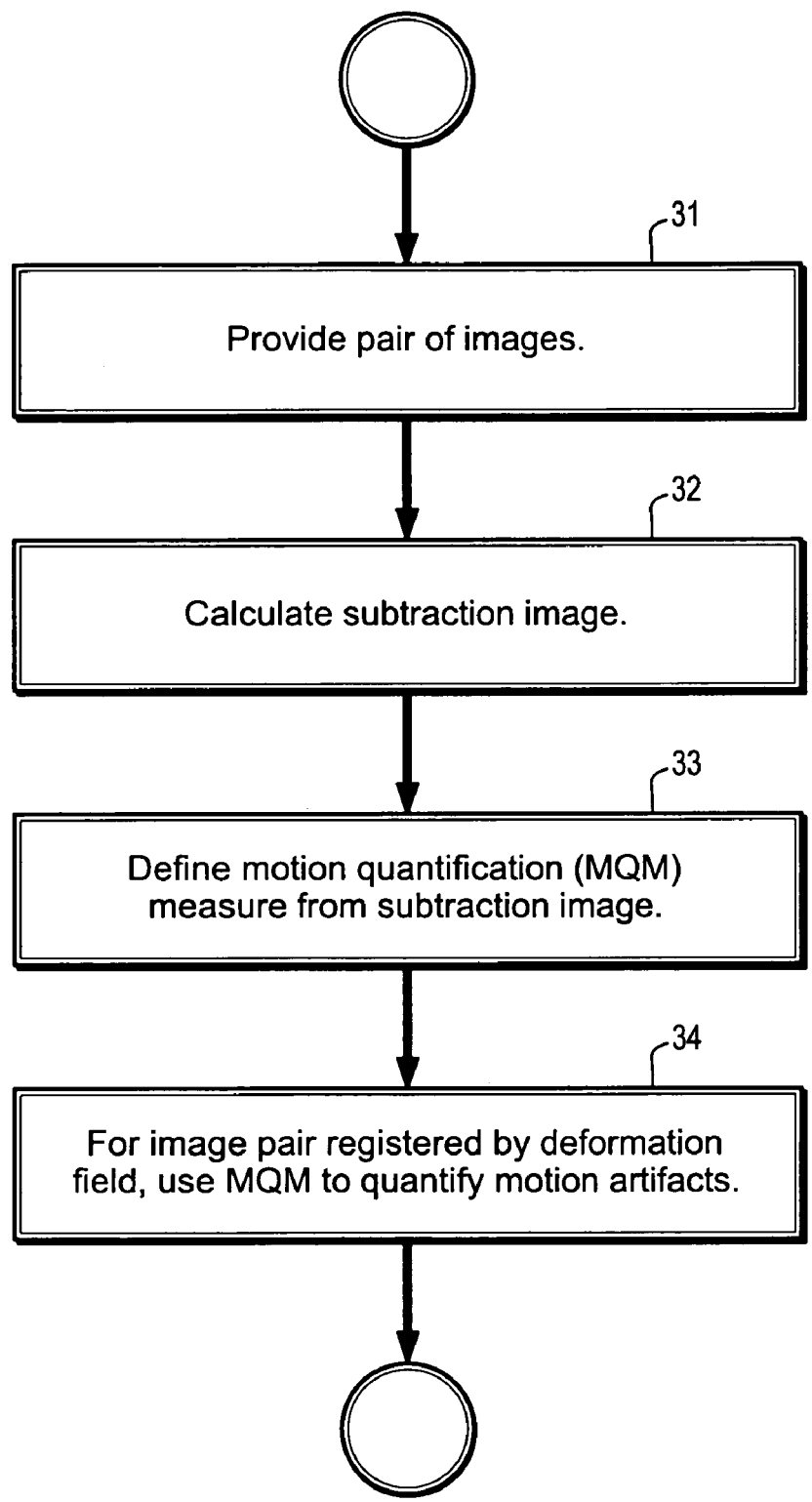
FIG. 3 is a flow chart of an exemplary method for quantifying motion artifacts in image sequences, according to an embodiment of the invention.

A flow chart of an exemplary method for quantifying motion artifacts in image sequences, according to an embodiment of the invention, is depicted in FIG. 3. Referring now to the figure, a pair of images is provided at step 31. As described above, these images can be, according to one embodiment of the invention, images of the same object acquired at different times. According to an embodiment of the invention, the images are acquired through different imaging modalities, including, but not limited to, computed tomography (CT), magnetic resonance resonance imaging (MRI), positron emission tomography (PET), and ultrasound (US). According to another embodiment of the invention, a contrast enhancing agent was applied before acquisition of the latter image. According to another embodiment of the invention, the images a deformation field has been calculated to define a registration between the two images. At step 32, a subtraction image is defined by calculating a difference of the two images. According to an embodiment of the invention, a subtraction image $I_\Delta$ can be defined by $I_\Delta(x,y,z) = I_1(x,y,z) - I_2(x,y,z)$, where $I_1$ and $I_2$ are the first ands second images, respectively. At step 33, an MQM is calculated from the subtraction image. According to one embodiment of the invention, an MQM $|\langle I_\Delta^- \rangle|$ is defined by $$|\langle I_\Delta^- \rangle| = \frac{\beta}{N^-} \sum_{x,y,z} [f(I_\Delta(x, y, z)) \mid I_\Delta(x, y, z) < 0]$$

where the sum is restricted to those points such that $I_\Delta < 0$, $f$ is a function, $\beta$ is a constant, and $N^-$ is the number of domain points with negative subtraction image values. According to a further embodiment of the invention, the constant $\beta$ is equal to about 1.0. According to a further embodiment of the invention, the function $f$ is the absolute value function. It is to be understood that the absolute value function is exemplary, and other functions with positive-definite range of values are within the scope of an embodiment of the invention. Once the MQM has been calculated, if the images have been registered by a deformation field, the MQM, by quantifying the motion artifacts in the subtraction image, provides a measure 34 of the quality of the image registration.

Figure 2:
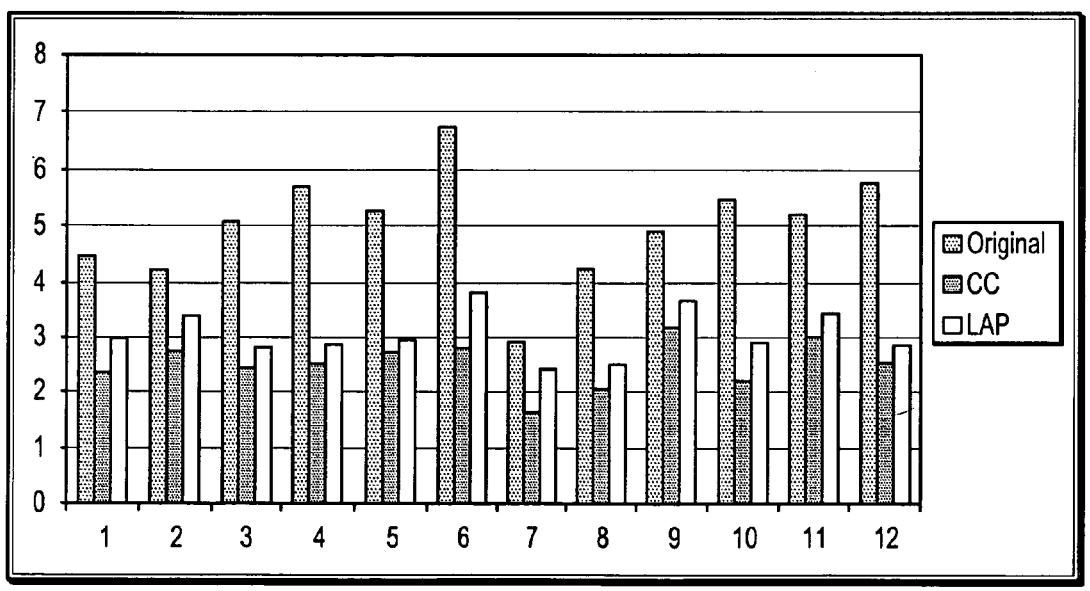
FIG. 2 is a bar graph of results of computing an MQM over a set of 12 perfusion sequences, according to an embodiment of the invention.

An MQM according to an embodiment of the invention was tested on a sequence of perfusion images of a breast. The results of computing an MQM over a set of 12 perfusion sequences is illustrated in the bar graph of FIG. 2. For each sequence, the MQM is computed before motion correction, and illustrated with the bars labeled "Original", after motion correction using a high quality algorithm, illustrated with the bars labeled "CC", and after motion correction using a fast, interactive motion correction algorithm, illustrated with the bars labeled "LAP". These quantitative results are in good agreement with human visual evaluation of the quality of motion correction for these sequences.

It is to be understood that various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Furthermore, it is to be understood that the present invention can be implemented in various forms of hardware, software, firmware, special purpose processes, or a combination thereof. In one embodiment, the present invention can be implemented in software as an application program tangibly embodied on a computer readable program storage device. The application program can be uploaded to, and executed by, a machine comprising any suitable architecture.

Figure 4:
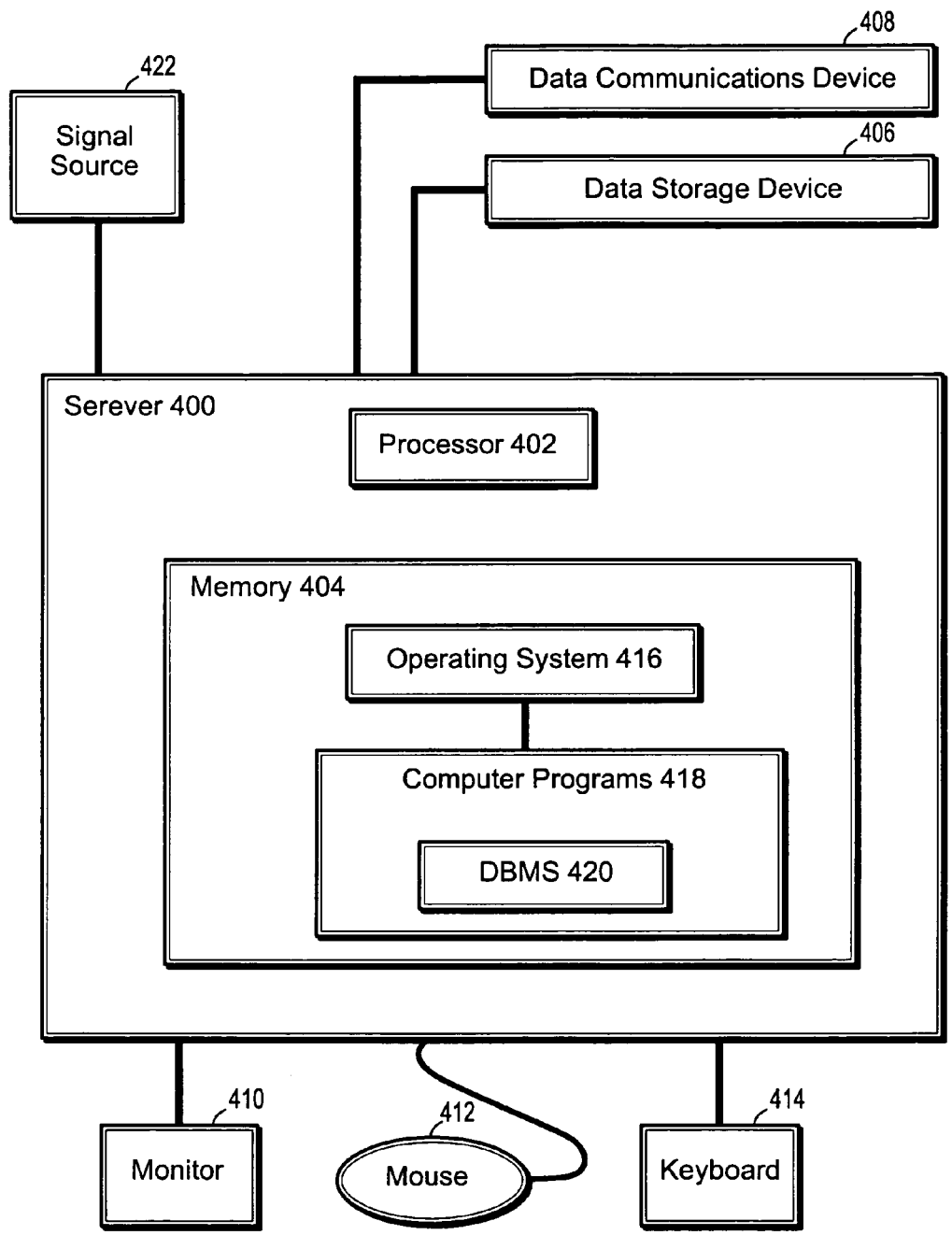
FIG. 4 is a block diagram of an exemplary computer system for implementing a system for quantifying motion artifacts in image sequences according to an embodiment of the invention.

Accordingly, FIG. 4 illustrates a hardware environment used to implement an embodiment of the present invention. As illustrated in FIG. 4, an exemplary embodiment of the present invention is implemented in a server computer ("server") 400. The server 400 generally includes, a processor 402, a memory 404 such as a random access memory (RAM), a data storage device 406 (e.g., hard drive, floppy disk drive, CD-ROM disk drive, etc.), a data communication device 408 (e.g., modem, network interface device, etc.), a monitor 410 (e.g., CRT, LCD display, etc.), a pointing device 412 (e.g., a mouse, a track ball, a pad or any other device responsive to touch, etc.) and a keyboard 414. It is envisioned that attached to the computer 400 may be other devices such as read only memory (ROM), a video card drive, printers, a signal source 422, and other peripheral devices including local and wide area network interface devices, etc. One of ordinary skill in the art will recognize that any combination of the above system components may be used to configure the server 400.

The server 400 operates under the control of an operating system ("OS") 416, such as Linux, WINDOWS™, WINDOWS NT™, etc., which typically, is loaded into the memory 404 during the server 400 start-up (boot-up) sequence after power-on or reset. In operation, the OS 416 controls the execution by the server 400 of computer programs 418, including server and/or client-server programs. Alternatively, a system and method in accordance with the present invention may be implemented with any one or all of the computer programs 418 embedded in the OS 416 itself to process the signal from the signal source 422 without departing from the scope of an embodiment of the invention. Preferably, however, the client programs are separate from the server programs and may not be resident on the server.

The OS 416 and the computer programs 418 each comprise computer readable instructions which, in general, are tangibly embodied in or are readable from a media such as the memory 404, the data storage device 406 and/or the data communications device 408. When executed by the server 400, the instructions cause the server 400 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 400 is typically used as a part of an information search and retrieval system capable of receiving, retrieving and/or dissemination information over the Internet, or any other network environment. One of ordinary skill in the art will recognize that this system may include more than one of server 400.

In the information search and retrieval system, such as a digital library system, a client program communicates with the server 400 by, inter alia, issuing to the server search requests and queries. The server 400 then responds by providing the requested information. The digital library system is typically implemented using a database management system software (DBMS) 420. The DBMS 420 receives and responds to search and retrieval requests and termed queries from the client. In the preferred embodiment, the DBMS 420 is server-resident.

Objects are typically stored in a relational database connected to an object server, and the information about the objects is stored in a relational database connected to a library server, wherein the server program(s) operate in conjunction with the (DBMS) 420 to first store the objects and then to retrieve the objects. One of ordinary skill in the art will recognize that the foregoing is an exemplary configuration of a system which embodies the present invention, and that other system configurations such as an ultrasound machine coupled to a workstation via network to access the data in the ultrasound machine may be used without departing from the scope and spirit of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method of evaluating the quality of a match between two digitized images, said method performed by the computer comprising the steps of:

providing a pair of digitized images, each image comprising a plurality of intensities corresponding to a domain of points on an 3-dimensional grid, wherein said images depict the same object at different times, and wherein a contrast enhancing agent was applied to said object before the acquisition of at least one of said images, calculating a subtraction image $I_\Delta$ as $I_\Delta(x,y,z)=I_2(x,y,z)-I_1(x,y,z)$, wherein $(x,y,z)$ represents a point in the domain, $I_1(x,y,z)$ is a first image of said pair of images and $I_2(x,y,z)$ is a second image of said pair of images; and calculating a motion quantification measure $|\langle I_\Delta^- \rangle|$ from said difference of said pair of images as $$|\langle I_\Delta^- \rangle| = \frac{\beta}{N^-} \sum_{x,y,z} [f(I_\Delta(x,y,z)) \mid I_\Delta(x,y,z) < 0],$$

wherein the sum is restricted to those $I_\Delta<0$, $f$ is a function, $\beta$ is a constant, and $N^-$ is the number of domain points with negative subtraction image values, wherein said motion quantification measure quantifies motion artifacts in said pair of images.

2. The method of claim 1, wherein said pair of images is related by a deformation field of the domain of a first image of said pair of images into the domain of a second image of said pair of images, wherein said difference is computed using the deformation field for said first image.

3. The method of claim 2, wherein said deformation field $\Phi=(\phi_x,\phi_y,\phi_z)$ for transforming a point $(x,y,z)$ in the first domain into a point $(X,Y,Z)$ in the second domain is defined by $$\begin{cases} X = \phi_x(x,y,z) = x + u_x(x,y,z) \\ Y = \phi_y(x,y,z) = y + u_y(x,y,z), \\ Z = \phi_z(x,y,z) = z + u_z(x,y,z) \end{cases}$$

wherein $u_x$, $u_y$, $u_z$ are displacement fields.

4. The method of claim 3, wherein said motion quantification measure measures the quality of the deformation field relating the pair of images.

5. The method of claim 1, wherein the constant $\beta$ is equal to about 1.0, and the function $f$ is the absolute value function.

6. A computer implemented method of evaluating the quality of a match between two digitized images, said method performed by the computer comprising the steps of:

providing a pair of digitized images $I_1(x,y,z)$ and $I_2(x,y,z)$, each image comprising a plurality of intensities corresponding to a domain of points $(x,y,z)$ on an 3-dimensional grid;

calculating a motion quantification measure from said pair of images, wherein said motion quantification measure $|\langle I_\Delta^- \rangle|$ comprises $$|\langle I_\Delta^-\rangle| = \frac{\beta}{N^-}\sum_{x,y,z}[f(I_\Delta(x,y,z))\mid I_\Delta(x,y,z)<0]$$

wherein the sum is restricted to those $I_\Delta<0$, $f$ is a function, $\beta$ is a constant, $N^-$ is the number of domain points with negative subtraction image values, and wherein $$I_\Delta(x,y,z)=I_2(x,y,z)-I_1(x,y,z).$$

7. The method of claim 6, wherein said motion quantification measure quantifies motion artifacts in said pair of images.

8. The method of claim 6, wherein the constant $\beta$ is equal to about 1, and $f$ is the absolute value function.

9. The method of claim 6, wherein said images depict the same object at different times.

10. The method of claim 9, wherein a contrast enhancing agent was applied to said object before the acquisition of at least one of said images.

11. The method of claim 6, wherein said images depict the same object acquired through different imaging modalities.

12. A program storage device readable by a computer, tangibly embodying a program of instructions executable by the computer to perform the method steps for evaluating the quality of a match between two digitized images, said method comprising the steps of:

providing a pair of digitized images, each image comprising a plurality of intensities corresponding to a domain of points on an 3-dimensional grid, wherein said images depict the same object at different times, and wherein a contrast enhancing agent was applied to said object before the acquisition of at least one of said images, calculating a subtraction image $I_\Delta$ as $I_\Delta(x,y,z)=I_2(x,y,z)-I_1(x,y,z)$, wherein $(x,y,z)$ represents a point in the domain, $I_1(x,y,z)$ is a first image of said pair of images and $I_2(x,y,z)$ is a second image of said pair of images; and calculating a motion quantification measure $|\langle I_\Delta^-\rangle|$ from said difference of said pair of images as $$|\langle I_\Delta^-\rangle| = \frac{\beta}{N^-}\sum_{x,y,z}[f(I_\Delta(x,y,z))\mid I_\Delta(x,y,z)<0],$$

wherein the sum is restricted to those $I_\Delta<0$, $f$ is a function, $\beta$ is a constant, and $N^-$ is the number of domain points with negative subtraction image values, wherein said motion quantification measure quantifies motion artifacts in said pair of images.

13. The computer readable program storage device of claim 12, wherein said pair of images is related by a deformation field of the domain of a first image of said pair of images into the domain of a second image of said pair of images, wherein said difference is computed using the deformation field for said first image.

14. The computer readable program storage device of claim 13, wherein said deformation field $\Phi=(\phi_x,\phi_y,\phi_z)$ for transforming a point $(x,y,z)$ in the first domain into a point $(X,Y,Z)$ in the second domain is defined by $$\begin{cases} X = \phi_x(x,y,z) = x + u_x(x,y,z) \\ Y = \phi_y(x,y,z) = y + u_y(x,y,z), \\ Z = \phi_z(x,y,z) = z + u_z(x,y,z) \end{cases}$$

wherein $u_x$, $u_y$, $u_z$ are displacement fields.

15. The computer readable program storage device of claim 14, wherein said motion quantification measure measures the quality of the deformation field relating the pair of images.

16. The computer readable program storage device of claim 12, wherein the constant $\beta$ is equal to about 1.0, and the function $f$ is the absolute value function.

\* \* \* \* \*